United States Patent [19]
Ecker et al.

[11] 3,973,379
[45] Aug. 10, 1976

[54] POWERED LAWN MOWER HYDRAULIC SYSTEM

[75] Inventors: Franklin A. Ecker, Racine; Anthony J. Saiia, South Milwaukee, both of Wis.

[73] Assignee: Jacobsen Manufacturing Company, Racine, Wis.

[22] Filed: Apr. 24, 1975

[21] Appl. No.: 571,249

[52] U.S. Cl. ................................. 56/11.9; 56/7; 56/11.2
[51] Int. Cl.² ........................................ A01D 69/00
[58] Field of Search .................. 56/6, 7, 11.9, 12.1, 56/10.9, 11.2, 250, 249

[56] References Cited
UNITED STATES PATENTS 3,177,638  4/1965  Johnson .................................. 56/7
3,918,240  11/1975  Haffner et al. ........................... 56/7

*Primary Examiner*—Russell R. Kinsey
*Attorney, Agent, or Firm*—Arthur J. Hansmann

[57] ABSTRACT

A powered lawn mower hydraulic system for use with a reel type of mower. The system includes a hydraulic pump and a hydraulic motor and a hydraulic valve, all interconnected with hydraulic hoses or lines. The valve permits reversing of the direction of rotation of the motor which is driving the mower reel, and there is a hydraulic flow restrictor in the reversing line for limiting the speed of the motor, and thus the mower, in the reversing direction. Also, there is shown a relief valve for limiting the hydraulic pressure in the reversing mode, and there is also shown a relief valve for limiting the hydraulic pressure in the forward mode.

3 Claims, 2 Drawing Figures

POWERED LAWN MOWER HYDRAULIC SYSTEM

This invention relates to a powered lawn mower hydraulic system, and, more particularly, it relates to a hydraulic system for powering a lawn mower reel in both the forward and reverse directions.

BACKGROUND OF THE INVENTION

The lawn mowing industry is already aware of hydraulic systems for powering lawn mowers for use in their normal operation of cutting the grass. For example, U.S. Pat. No. 3,563,012 shows the use of a hydraulic motor incorporated in a hydraulic system which has reel type mowers supported on a tractor, and the hydraulic motors power the reels in the course of mowing the grass. Also, U.S. Pat. No. 3,744,522 discloses a hydraulic valve which has multiple settings for directing hydraulic fluid to various motors for operating the motors for any useful purpose. Of course the prior art already contains many other arrangements and embodiments of hydraulic systems for performing useful work, and wherein hydraulic motors are included in the system and are driven in forward and reverse directions, all under the control of hydraulic valves, such as spool type valves.

Still further, the lawn mower industry is also aware of arrangements for powering reels of reel type mowers such that the reel is powered in a forward grass-cutting direction and it can also be powered in a reverse direction for the purpose of sharpening the reel against the bed-knife. An example of one such prior art patent is U.S. Pat. No. 3,668,844 which shows a mechanically operated system for reversing the direction of rotation of the lawn mower reel for the sharpening and lapping purpose.

The present invention provides a hydraulic system for powering the lawn mower reel in both the forward and reverse directions, for the purposes mentioned. Accordingly, it is a general object and an advantage in the present invention to improve upon the prior art arrangements. In accomplishing this objective, the present invention utilizes a hydraulic system with a minimum of elements and components and with the components being relatively simple in their construction and arrangement in the system, all for providing a low-cost system which is also efficient and reliable.

A specific objective of the present invention is to provide a hydraulic system for powering a lawn mower wherein the mower reel can be powered in a reverse direction, for the purpose of lapping the reel against the mower bed-knife, and the reel is rotated at a limited speed such that, in the instance of backlapping, the lapping compound is not thrown off the reel blades, the system is not subjected to undue hydraulic pressure and the blades are not unduly heated by excessive rotational speeds. Also, the present invention provides a means for readily and easily reversing the direction of rotation of the mower reel, for the purpose of releasing foreign objects and debris which might be jamming the reel against the mower bed-knife.

Still further, the present invention provides a hydraulic system for powering a lawn mower and at least some of the components of the system are incorporated in a single housing, such that the hydraulic motor, and the hydraulic valve, and hydraulic-pressure relief valves can all be incorporated in a single housing which can be located adjacent the mower itself. With this compact arrangement, the components mentioned are all conveniently located and can therefore operate efficiently. Also, in this arrangement, the hydraulic passageway for the drainage of hydraulic fluid which might pass the seals of say the motor itself can be directed through an internal drain in the housing so that an external drain line or hose need not be provided and high-pressure seals need not be employed.

Still a further objective and advantage of the present invention is to provide a hydraulic system for a lawn mower wherein the system includes relief valve components and a control valve, all arranged so that the mower can be driven in a reverse direction and with the hydraulic pressure being less in the reverse direction than that of the forward direction of mower driving, and thus the reverse direction speed and development of heat and wear factors are controlled.

Other objects and advantages will become apparent upon reading the following description in light of the accompanying drawings.

DETAILED DESCRIPTION OF THE PREFERRED EMBODIMENTS

Figure 1:
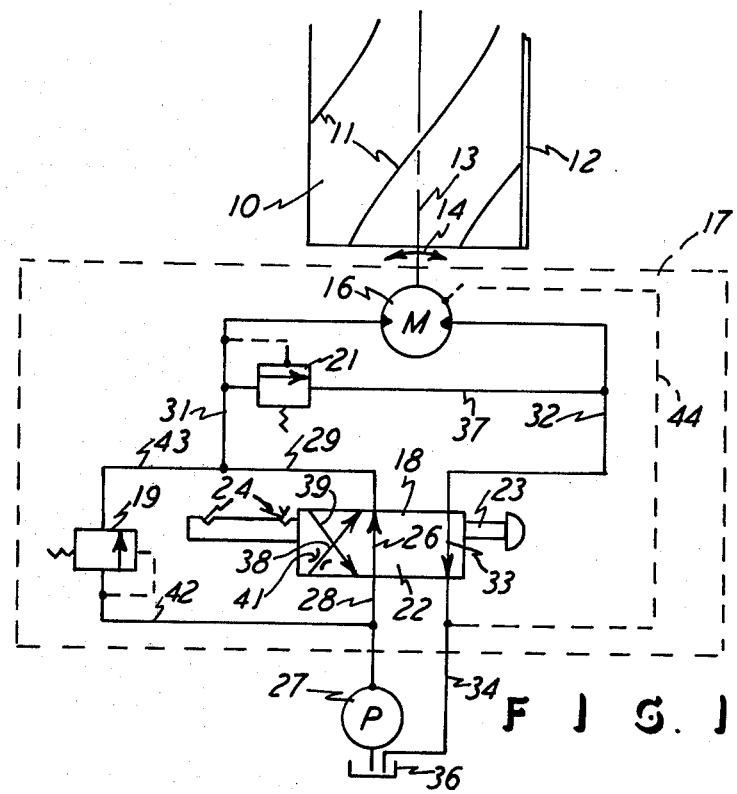
FIG. 1 is a diagrammatic view of a hydraulic system connected with a reel-type mower and showing one embodiment of this invention.

FIG. 1 shows the diagram of a reel-type lawn mower having a rotatably mounted reel 10 having grass-cutting blades 11 and a stationary bed-knife 12. Thus, in the usual and conventional arrangement of a reel lawn mower, the reel 10 rotates about the mower axis 13 and operates against the usual bed-knife 12 for cutting the grass. Further, in this particular invention, it is significant that the reel 10 can be rotated in a reverse direction, and thus the two directions of rotation, namely the forward cutting direction and the reverse direction, can be achieved with the reel 10 and are indicated by the arrowhead designated 14 which also indicate that a hydraulic motor 16 is a bi-directional type of motor and rotates in a forward and a reverse direction. That is, when the reel 10 is rotated in the reverse direction, that is the direction opposite to the normal direction of grass cutting, the reel 10 can have its blades 11 move across the bed-knife 12, for lapping the blades 11 or for releasing any foreign object which may have been trapped between the blades 11 and the bed-knife 12.

The hydraulic system of this invention is shown to include a housing designated 17 and shown in dotted lines and the housing 17 is that which encloses and is part of the motor 16. A hydraulic valve 18 and two hydraulic pressure relief valves 19 and 21 and the various connecting passageways or lines shown within the housing 17 are all enclosed by and incorporated in the housing 17.

The hydraulic valve 18 is of a spool type and therefore has a spool 22 which can slide to the left and right, as viewed in FIG. 1, in the usual manner of a spool type valve, and there may be a handle 23 and a detent arrangement 24 for maintaining the shifted spool 22 in either one of two positions. In the spool position shown in FIG. 1, the spool has the fluid passageway 26 which receives fluid from a hydraulic pump 27 through a line or passageway 28. In turn, the hydraulic fluid flows through the passageway 29 and to a passageway 31 which directs the fluid to the motor 16 for the forward direction of rotation of the motor 16. Also, a fluid passageway or line 32 directs the return flow of fluid from the motor 16 and to the valve 18 and through the valve passageway 33 and to a return line 34 and back to a hydraulic reservoir 36. Thus, in the setting of the spool 22 in the FIG. 1 position, the motor 16 is operated in a forward direction which may be the direction of grass cutting for the reel 10 which is driven by the motor 16, in a conventional arrangement of a driving connection therebetween. For example, the reel and the hydraulic motor may be as shown and as combined in U.S. Pat. No. 3,511,034.

It will also be seen and understood by one skilled in the art that with the hydraulic system arranged as shown in FIG. 1, if the hydraulic pressure exceeds a certain amount in the forward drive of the hydraulic motor 16, then the pressure relief valve 21 will sense the excessive pressure in the input line 31 and will then relieve that pressure by opening and permitting the pressure to be relieved through the line or passageway 37 which connects between the input line 31 and the drain line 32.

The valve 18 also has a reverse mode or position, and this reverse position occurs when the spool 22 is shifted to the right, as seen in FIG. 1, so that the spool has a passageway 38 which aligns between the passageways or lines 28 and 32, and the spool also has a passageway 39 which then aligns between the lines 29 and 34. With that arrangement of shifting the spool 22 to the reverse mode, the output pressure of the pump 27 is then directed to the line 28 and through the spool passageway 38 and to the line or passageway 32 and thence to the motor 16, all for reverse direction or rotation of the motor 16. Of course the spool passageway 39 then serves as a drain between the line 31 and the line 29 and directs it to the drain line 34.

The pressure relief valve 19 is connected with the line 28 and is available for sensing the pressure in the reversing mode to thereby open the valve 19 and permit the output pressure of the pump 27 to be directed around the valve 18 and directly to the then drain line 29 and thence back to the drain line 34 and the reservoir 36.

With the arrangement of the relief valves 19 and 21, the valves are arranged so that the pressure to open the valve 21, as described above, is greater than that required for opening the valve 19, and thus the pressure for driving the motor in the forward direction is greater than that possible for driving the motor in the reverse direction. Also, the valve spool 22 has a flow restrictor designated 41 in the reverse passageway of the spool 22, and the restrictor 41 thus automatically creates greater pressure in the lines leading to the input of the valve 18 in the reverse mode, such as in the line 28, and thus, with the line 28 connected to the valve 19 through the line 42, the line 42 will receive the greater pressure and cause the lower-pressure relief valve 19 to open and thereby bleed off a portion of the fluid back to the drain line 34, rather than having the entire quantity of fluid directed to the motor 16 when the latter is being driven in the reverse direction. This causes the reduced reverse speed. Of course the valve 19 is connected to the line 29 through the passageway or line 43, as shown.

Still further, the arrangement with the housing 17 can be utilized such that there is an internal fluid drain passageway 44 extending between the motor 16 and the drain line 34, and thus there need not be any high-pressure seal for the motor 16 and there need not be any separate external drain line from the motor 16 and back to the reservoir 36.

Figure 2:
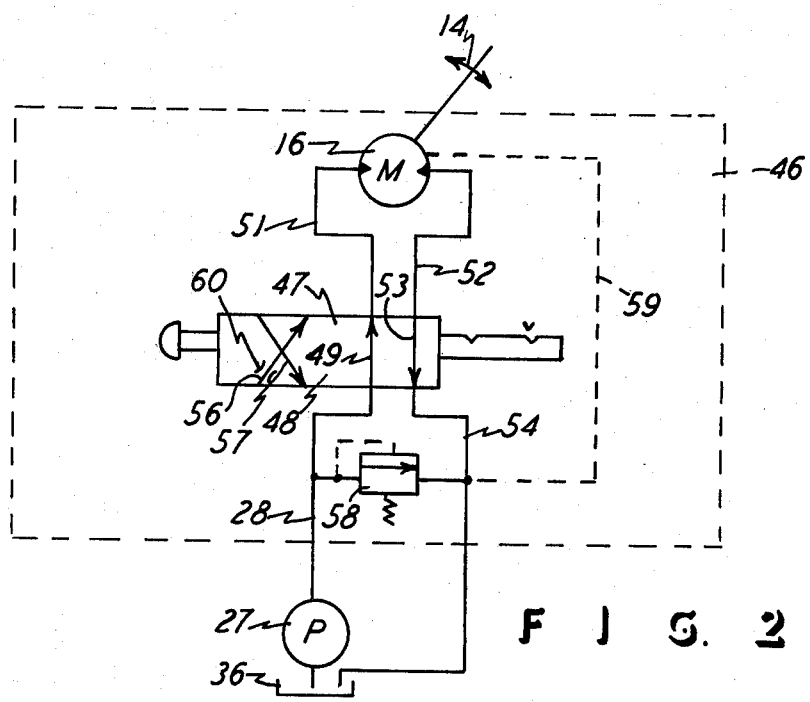
FIG. 2 is a diagrammatic view similar to FIG. 1, but showing another embodiment of the invention.

FIG. 2 shows a somewhat different embodiment, and it will be seen that the motor 16 is enclosed in a housing designated 46 and shown in dotted lines, and the motor 16 is bi-directional and shows the two directions by the double arrows 14, and of course the motor is in conventional driving arrangement with the reel 10, as shown and described above.

The pump 27 supplies fluid from the reservoir 36 and to the line 28 and up to a valve 47 which has its spool 48 arranged for receiving the flow of fluid from the line 28. Thus the spool passageway 49 receives the output from the pump 27 and directs it to a line or passageway 51 which in turn directs it to the motor 16, for forward direction of rotation of the motor 16. Also, a line or passageway 52 directs the hydraulic fluid back to the spool 48 and a return passageway 53 therein, and, the fluid flows into a return passageway 54 which returns the fluid back to the reservoir 36, as shown.

When the spool 48 is shifted to the right, as viewed in FIG. 2, then it presents a reversing passageway 56 which conducts the fluid from the line 28 and to the line 52, for reverse rotation of the motor 16. Also, the spool then has a return flow passageway 57 which conducts the fluid from the line 47 to the line 54, for the return flow in the reverse mode. Further, the spool 48 has a restricted passageway or restrictor 60 which creates the required fluid pressure in the lines connected with the motor 16, and a pressure relief valve 58 is connected across the passageways 28 and 54 to thus sense the pressure increase and to relieve it by causing a portion or all of the fluid to be directed from the line 28 and directly to the drain line 54. Thus, the pressure of the hydraulic fluid, when the system is in the reverse mode, is limited to a minimum pressure and thus the motor 16 is driven at a slower speed in the reverse direction, for the desired reasons mentioned at the outset. Also, the relief valve 58 is available for relieving pressure in the forward direction of rotation of the motor 16, but the arrangement in FIG. 2 does not have the facility for creating a higher pressure in the forward direction of rotation of the motor 16 and the lower pressure in the reverse direction of rotation of the motor 16, as in FIG. 1.

FIG. 2 also shows the internal drain line 59 which extends from the motor 16 and to the drain line 54, in the arrangement and for the purpose mentioned in connection with the drain line 44 of FIG. 1. Thus the arrangement permits the use of a bi-directional motor 16, and no high-pressure seal is required for the motor 16 and the drain can go through the internal drain lines 44 and 59, and the seal cavity for the motor 16 will not be pressurized, due to the internal drain passageways 44 and 59.

What is claimed is:

1. In a powered lawn mower including a reel-type lawn mower having a bed-knife and a rotatable reel, a hydraulic system including a hydraulic motor in driving relation with said reel for rotating the latter, and including a hydraulic pump and a hydraulic valve and a hydraulic system relief valve and hydraulic lines all hydraulically connected with said motor for supplying hydraulic fluid to said motor for operating said reel in a forward direction, the improvement comprising said motor being a reversible motor for operation in two directions of rotation which are the forward and reverse directions, said hydraulic valve having fluid passageways for directing hydraulic fluid to said motor for the two directions of rotation, the one of said fluid passageways for directing fluid to said motor in the reversing direction having a fluid-flow restrictor for limiting the reverse speed of said motor to less than the forward speed of said motor, and a second hydraulic relief valve in fluid-flow communication with said one fluid passageway and having a fluid pressure relief of a value less than that of said hydraulic system relief valve for relieving fluid pressure when said valve is in position for the reverse direction of rotation.

2. The powered lawn mower as claimed in claim 1, including a hydraulic housing for supporting and enclosing said motor and said valve, and said housing having an internal drain passageway extending in fluid-flow communication between said motor and the return flow one of said hydraulic lines of said system, for providing a drain passageway free of any requirement for another separate hydraulic line for presenting the drain passageway.

3. The powered lawn mower as claimed in claim 1, wherein said hydraulic valve is a spool type including a spool having said fluid-flow restrictor for effecting the lesser reverse speed.

\* \* \* \* \*